United States Patent
Bower, III et al.

(10) Patent No.: US 8,935,494 B2
(45) Date of Patent: Jan. 13, 2015

(54) BACKING UP AN IMAGE IN A COMPUTING SYSTEM

(75) Inventors: Fred A. Bower, III, Durham, NC (US); Ke Jie Cao, Shanghai (CN); Le Wei Ji, Shanghai (CN); Ye Xu, Shanghai (CN); Bin Qi Zhang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 252 days.

(21) Appl. No.: 13/560,121

(22) Filed: Jul. 27, 2012

(65) Prior Publication Data

US 2014/0032862 A1    Jan. 30, 2014

(51) Int. Cl.
*G06F 12/16* (2006.01)

(52) U.S. Cl.
USPC ........... 711/162; 711/112; 711/114; 711/156; 707/645; 707/646; 707/647

(58) Field of Classification Search
USPC .......... 711/162, 112, 114, 156; 707/645, 646, 707/647
See application file for complete search history.

(56) References Cited

U.S. PATENT DOCUMENTS

| | | | |
|---|---|---|---|
| 5,852,713 A | 12/1998 | Shannon | |
| 6,089,456 A * | 7/2000 | Walsh et al. | 235/472.01 |
| 6,108,152 A | 8/2000 | Du et al. | |
| 6,615,324 B1 * | 9/2003 | Fernald | 711/153 |
| 6,615,365 B1 | 9/2003 | Jenevein et al. | |
| 6,643,751 B2 * | 11/2003 | Rosenquist et al. | 711/163 |
| 6,880,060 B2 | 4/2005 | Talagala et al. | |
| 7,216,251 B2 | 5/2007 | Gaunt et al. | |
| 7,386,754 B2 | 6/2008 | Cronch | |
| 7,533,235 B1 | 5/2009 | Hamilton et al. | |
| 7,664,791 B1 | 2/2010 | Hamilton | |
| 7,734,888 B1 | 6/2010 | Hamilton et al. | |
| 7,907,823 B2 * | 3/2011 | Jureczki et al. | 386/252 |
| 8,631,460 B2 * | 1/2014 | Shea et al. | 726/1 |
| 2002/0021516 A1 | 2/2002 | Burns et al. | |
| 2003/0188153 A1 | 10/2003 | Demoff et al. | |
| 2007/0271609 A1 * | 11/2007 | Chen et al. | 726/19 |
| 2010/0088269 A1 | 4/2010 | Buller et al. | |
| 2010/0138566 A1 * | 6/2010 | Knight | 710/18 |
| 2010/0257403 A1 | 10/2010 | Virk et al. | |

* cited by examiner

*Primary Examiner* — Stephen Elmore
(74) *Attorney, Agent, or Firm* — Edward J. Lenart; Katherine S. Brown; Biggers Kennedy Lenart Spraggins LLP

(57) ABSTRACT

Methods, apparatus, and products for backing up an image in a computing system that includes computer memory, including: receiving, by a backup image manager, an image for one or more computing devices within the computing system; identifying, by the backup image manager, available protected computer memory within the computing system, wherein the available protected computer memory within the computing system is restricted from alteration by a user of the computing system; slicing, by the backup image manager, the image into a plurality of image slices; and storing, by the backup image manger, one or more of the image slices in the available protected computer memory.

20 Claims, 4 Drawing Sheets

BACKING UP AN IMAGE IN A COMPUTING SYSTEM

BACKGROUND OF THE INVENTION

1. Field of the Invention

The field of the invention is data processing, or, more specifically, methods, apparatus, and products for backing up an image in a computing system.

2. Description of Related Art

A system image for a modern computing system may be used to restore a malfunctioning computing system. System images, however, can be quite large. System images are commonly stored on restoration media such as a DVD or set of DVDs. Alternatively, system images may be downloaded from an Internet-based recovery service.

SUMMARY OF THE INVENTION

Methods, apparatus, and products for backing up an image in a computing system, the computing system including computer memory, including: receiving, by a backup image manager, an image for one or more computing devices within the computing system; identifying, by the backup image manager, available protected computer memory within the computing system, wherein the available protected computer memory within the computing system is restricted from alteration by a user of the computing system; slicing, by the backup image manager, the image into a plurality of image slices; and storing, by the backup image manger, one or more of the image slices in the available protected computer memory.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
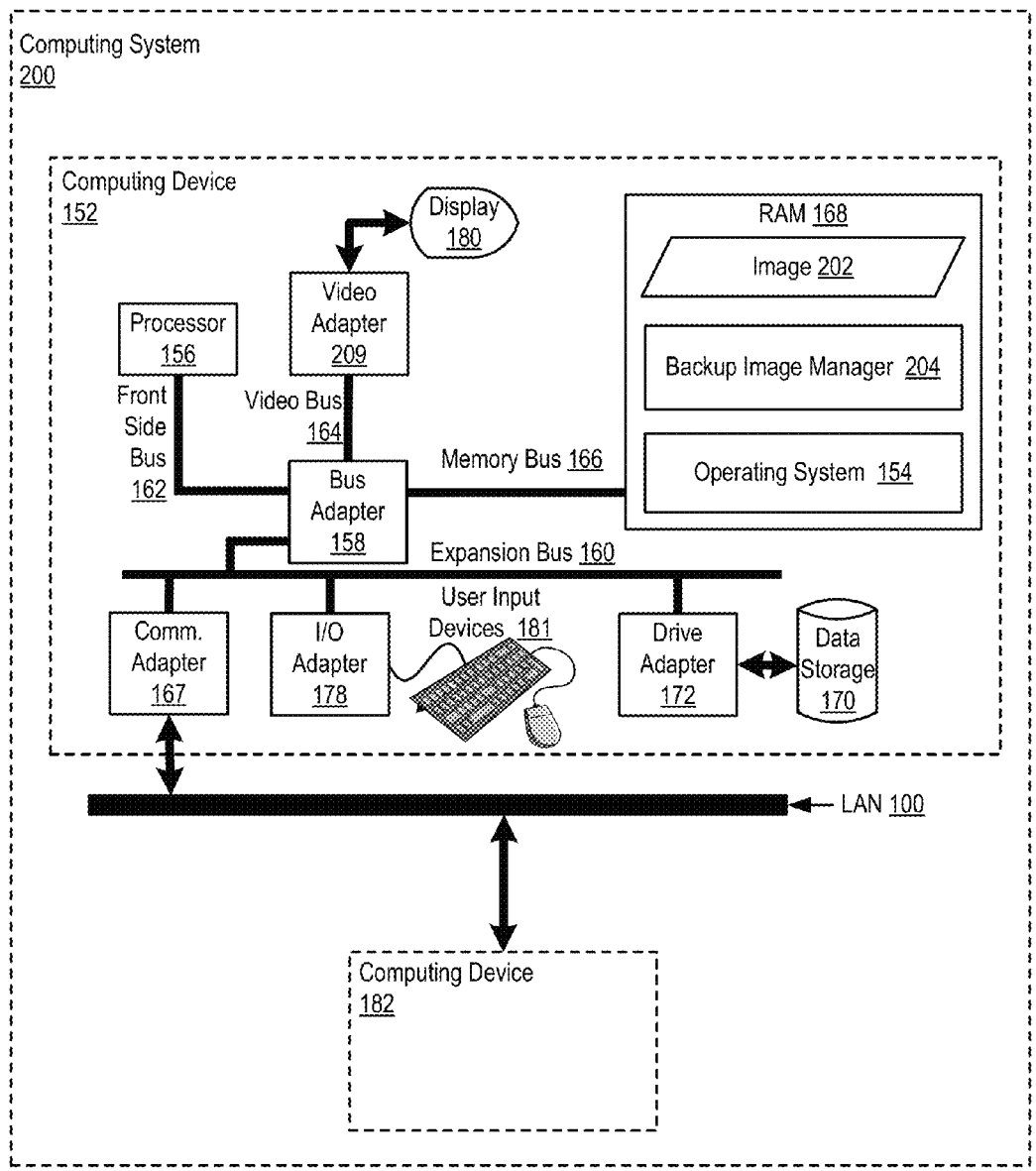
FIG. 1 sets forth a block diagram of automated computing machinery comprising an example computing system useful in backing up an image according to embodiments of the present invention.

Example methods, apparatus, and products for backing up an image in a computing system in accordance with the present invention are described with reference to the accompanying drawings, beginning with FIG. 1. FIG. 1 sets forth a block diagram of automated computing machinery comprising an example computing system (200) useful in backing up an image according to embodiments of the present invention. In the example of FIG. 1, the computing system (200) includes a plurality of network-connected computing devices such as computing device (152) and computing device (182). The example computing device (152) of FIG. 1 includes at least one computer processor (156) or 'CPU' as well as random access memory (168) ('RAM') which is connected through a high speed memory bus (166) and bus adapter (158) to processor (156) and to other components of the computing system (200).

Stored in RAM (168) is a backup image manager (204), a module of computer program instructions for backing up an image in a computing system (200) according to embodiments of the present invention. The image (202) of FIG. 1 represents a copy of the state of one or more computing devices (152, 182) in the computing system (200) and may be used to restore the one or more computing devices (152, 182) in the computing system (200) to the state contained in the image (202). The image (202) can include, for example, a copy of the operating system running on one or more computing devices (152, 182) in the computing system (200), a copy of firmware stored in one or more computing devices (152, 182) in the computing system (200), a copy of software applications executing on one or more computing devices (152, 182) in the computing system (200), a copy of the content of memory devices (152, 182) in the computing system (200), and so on.

The backup image manager (204) of FIG. 1 is configured to back up an image (202) by receiving an image (202) for one or more computing devices (152, 182), such as computing device (152) or computing device (182), in the computing system (200). In the example of FIG. 1, the backup image manager (204) can back up an image in a computing system (200) at the time that the computing system (200) is manufactured. That is, the image to be backed up can be divided into a set of slices that are programmed into computing systems that are being manufactured. In this mode, there is no guarantee that unique slices will be delivered to a customer, but the distribution of slices and orders should result in a partial backup image being delivered without the customer running any form of backup program. Alternatively, the backup image manager (204) can back up an image in a computing system (200) during the operation of the computing system (200). That is, the backup image manager (204) may broadcast a request to all of the computing devices (152, 182) in the computing system (200) to discover available protected storage for purposes of creating a backup.

The backup image manager (204) of FIG. 1 is further configured to back up an image (202) by identifying available protected computer memory within the computing system (200). The available protected computer memory within the computing system (200) is restricted from alteration by a user of one or more computing devices (152, 182) in the computing system (200). Examples of available protected computer memory can include unused areas of flash memory that is otherwise used to store firmware, unused areas of memory that is used to store a hidden file system, memory that has not been partitioned, or any other free memory that may not be altered by a user of one or more computing devices in the computing system (200) or user-level applications executing in the computing system (200). In the example of FIG. 1, the available protected computer memory within the computing system (200) may be computer memory that resides on any of the computing devices (152, 182) in the computing system. That is, one portion of the available protected computer memory within the computing system (200) may be computer memory that resides on computing device (152) and another portion of the available protected computer memory within the computing system (200) may be computer memory that resides on computing device (182).

The backup image manager (204) of FIG. 1 is further configured to back up an image (202) by slicing the image (202) into a plurality of image slices. Slicing the image (202) into a plurality of image slices may be carried out, for example, by separating the image (202) into a plurality of pieces that may later be combined to form the entire image (202). For example, an image (202) that is 200 MB in size may be sliced into two hundred slices that are 1 MB in size, fifty slices that are 4 MB in size, and so on. In such an example, each slice includes distinct information that, when combined with all other slices in the appropriate order, produces a complete image (202). In the example of FIG. 1, each image slice may include metadata describing the image slice. The metadata describing the image slice can include, for example, information such as a sequence number that enables the image to be reconstructed properly, error detection information used to determine whether the image slice has been corrupted, error correction information used to repair a corrupted image slice, and so on.

The backup image manager (204) of FIG. 1 is further configured to back up an image (202) by storing one or more of the image slices in the available protected computer memory. Because the available protected computer memory is restricted from alteration by a user one or more computing devices in the computing system (200), the one or more image slices may be stored in the available protected computer memory during the manufacturing process of the computing system (200), while configuring the computing system (200) by a system administrator, while initializing one or more computing devices in the computing system (200) by an operating system, and so on. In such a way, the one or more of the image slices are stored in the available protected computer memory at a point in time where the computing system (200) is not available for use by a user.

Also stored in RAM (168) is an operating system (154). Operating systems useful backing up an image in a computing system according to embodiments of the present invention include UNIX™ Linux™ Microsoft XP™ AIX™ IBM's i5/OS™ and others as will occur to those of skill in the art. The operating system (154) and the backup image manager (204) in the example of FIG. 1 are shown in RAM (168), but many components of such software typically are stored in non-volatile memory also, such as, for example, on a disk drive (170).

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computers for backing up an image in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing device (152) of FIG. 1 includes a communications adapter (167) for data communications with other computing devices (182) in the computing system (200) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for backing up an image in a computing system according to embodiments of the present invention include modems for wired dial-up communications, Ethernet (IEEE 802.3) adapters for wired data communications, and 802.11 adapters for wireless data communications.

Figure 2:
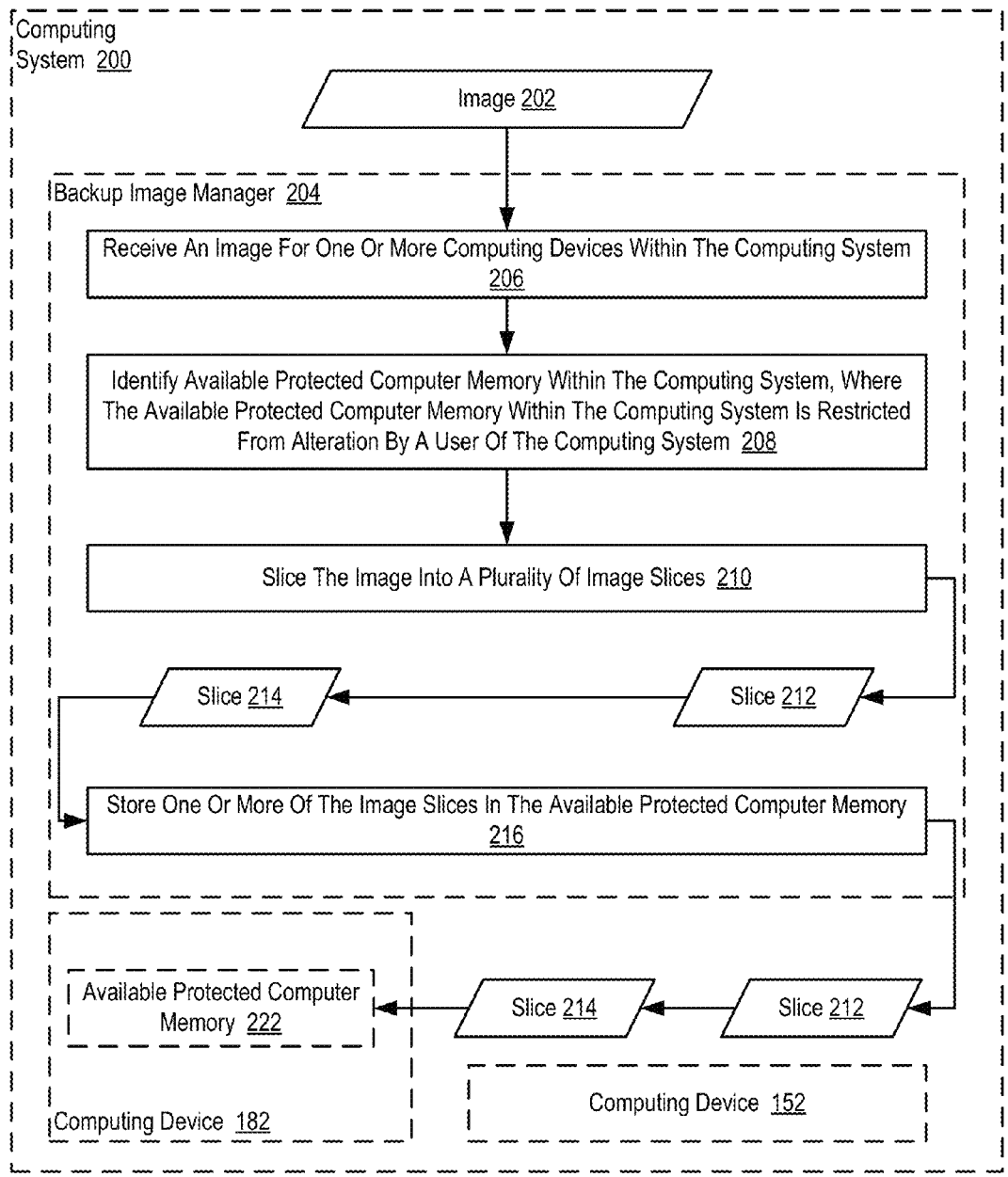
FIG. 2 sets forth a flow chart illustrating an example method for backing up an image in a computing system according to embodiments of the present invention.

For further explanation, FIG. 2 sets forth a flow chart illustrating an example method for backing up an image in a computing system according to embodiments of the present invention. The example method of FIG. 2 includes receiving (206), by a backup image manager (204), an image (202) for one or more computing devices (152, 182) within the computing system (200). In the example method of FIG. 2, the backup image manager (204) may be embodied as a module of computer program instructions executing on computer hardware. The backup image manager (204) of FIG. 2 is configured for backing up an image (202) for one or more computing devices (152, 182) within the computing system (200). The image (202) of FIG. 2 represents a copy of the entire state of one or more computing devices (152, 182) within the computing system (200) and may be used to restore one or more computing devices (152, 182) within the computing system (200) to the state contained in the image (202). The image (202) can include, for example, a copy of the operating system running on one or more computing devices (152, 182) within the computing system (200), a copy of firmware stored in one or more computing devices (152, 182) within the computing system (200), a copy of software applications executing on one or more computing devices (152, 182) within the computing system (200), a copy of the content of memory devices in the computing system (200), and so on.

The example method of FIG. 2 also includes identifying (208), by the backup image manager (204), available protected computer memory (222) within the computing system (200). In the example method of FIG. 2, the available protected computer memory (222) within the computing system (200) is restricted from alteration by a user of the computing system (200). Examples of available protected computer memory (222) can include unused areas of flash memory that are used to store firmware, unused areas of memory that are used to store a hidden file system, memory that has not been partitioned, or any other free memory that may not be altered by a user of the computing system (200) or user-level applications executing in the computing system (200). In the example method of FIG. 2, some portions of the available protected computer memory (222) may reside one a first computing device (182) and other portions of the available protected computer memory (222) may reside on other computing devices (152).

Consider an example in which the computing system includes 50 MB of flash memory that is used to store firmware. Assume that in order to prevent a user from corrupting the firmware, a system policy is in place such that the 50 MB of flash memory may not be altered by a user of the computing system (200) or user-level applications executing in the computing system (200). Further assume that the firmware stored in the 50 MB of flash memory includes computer program instructions that take up only 35 MB of memory. In such an example, there are 15 MB of flash memory that is not in use. The 15 MB of flash memory that is not in use, however, cannot be utilized by a user of the computing system (200) or user-level applications executing in the computing system (200) because access to the flash memory is restricted. The 15 MB of flash memory that is not in use in this example would qualify as available protected computer memory (222) within the computing system (200), as it is memory that is not currently in use (i.e., available) but is also memory that is restricted from alteration by a user of the computing system (200).

The example method of FIG. 2 also includes slicing (210), by the backup image manager (204), the image (202) into a plurality of image slices (212, 214). In the example method of FIG. 2, slicing (210) the image (202) into a plurality of image slices (212, 214) may be carried out, for example, by separating the image (202) into a plurality of pieces that may later be combined to form the entire image (202). For example, an image (202) that is 200 MB in size may be sliced into two hundred slices that are 1 MB in size, fifty slices that are 4 MB in size, into any number of slices of different sizes, and so on. In such an example, each slice includes distinct information that, when combined with all other slices in the appropriate order, produces a complete image (202).

The example method of FIG. 2 also includes storing (216), by the backup image manger (204), one or more of the image slices (212, 214) in the available protected computer memory (222). In the example method of FIG. 2, because the available protected computer memory (222) is restricted from alteration by a user of the computing system (200), the one or more of the image slices (212, 214) may be stored (216) in the available protected computer memory (222) during the manufacturing process of the computing system (200), while configuring the computing system (200) by a system administrator, while initializing the computing system (200) by an operating system, and so on. In such a way, the one or more of the image slices (212, 214) are stored (216) in the available protected computer memory (222) at a point in time where the computing system (200) is not available for use by a user. In the example method of FIG. 2, the image slices (212, 214) are stored (216) in available protected computer memory (222) contained within computing device (182), although readers will appreciate that the image slices (212, 214) could alternatively be stored (216) in available protected computer memory (not shown) contained within computing device (152).

After one or more of the image slices (212, 214) are stored (216) in the available protected computer memory (222), an error detection process may subsequently identify a system failure in the computing system (200). Such a system failure may include the occurrence of any event that prevents the computing system (200) from operating normally. A system failure can include, for example, the failure to find a necessary piece of system software, the presence of a corrupted system file, the occurrence of some event that otherwise causes the computing system (200) to freeze, and so on. In such an example, the system failure in the computing system (200) causes the computing system (200) to be in an operating state that prevents the computing system (200) from operating normally. Because one or more of the image slices (212, 214) are stored (216) in the available protected computer memory (222), however, the computing system (200) may be restored after the occurrence of a system failure.

The computing system (200) may be restored after the occurrence of a system failure by a restoration process that makes use of the one or more of the system image slices (212, 214) stored in the available protected computer memory (222). The restoration process has the job of analyzing the system to determine what needs to be replaced. This can be achieved via consistency checks or via comparison to an index contained in the restoration process. Consider an example in which the system failure indicated that a particular file utilized by an operating system running on the computing system (200) had been corrupted. In such an example, a backup copy of the particular file in its original state could be copied from one or more of the image slices (212, 214) and written into a memory location at which the corrupted file existed, thereby replacing the corrupted file with a copy of the file in its original, uncorrupted state.

Figure 3:
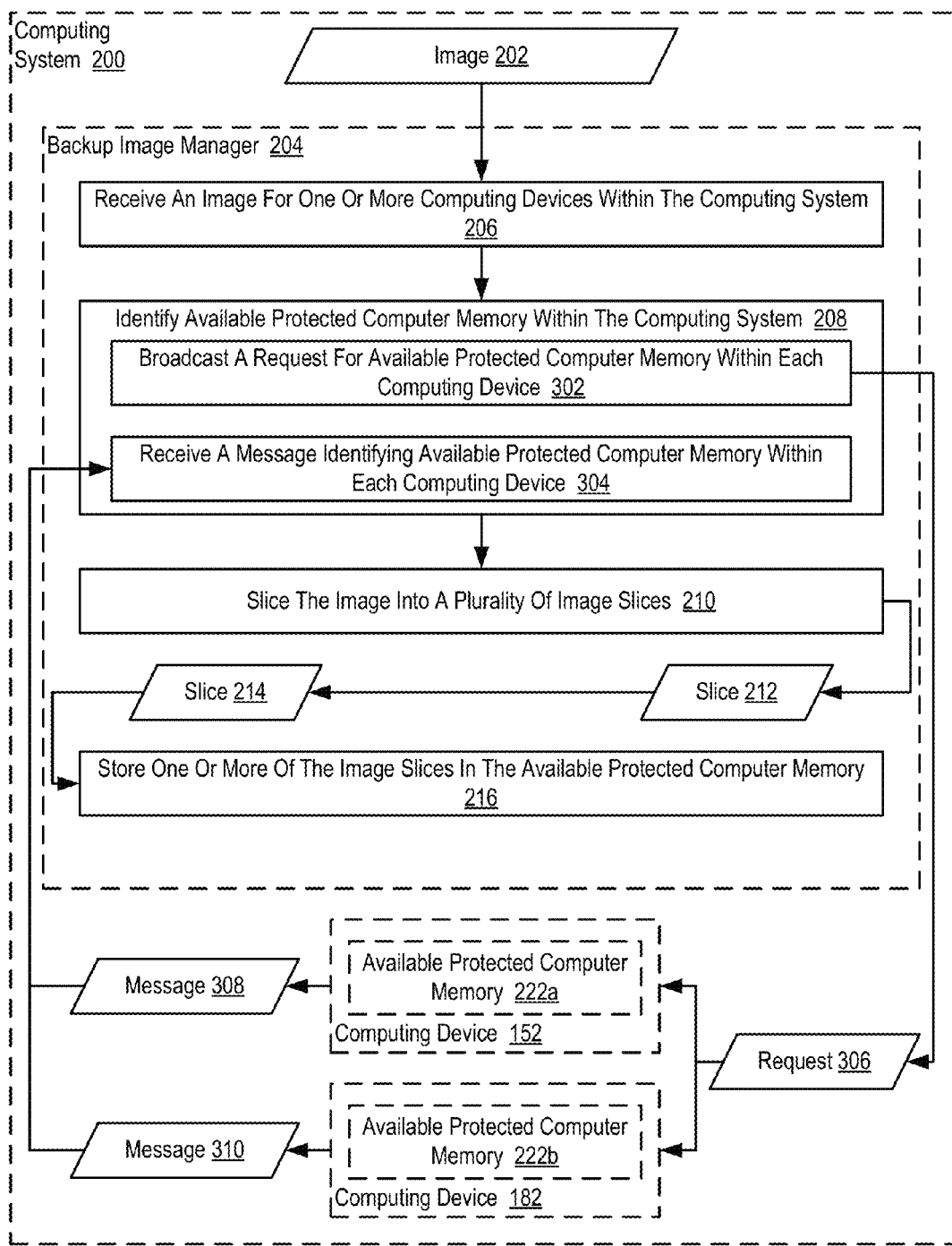
FIG. 3 sets forth a flow chart illustrating a further example method for backing up an image in a computing system according to embodiments of the present invention.

For further explanation, FIG. 3 sets forth a flow chart illustrating a further example method for backing up an image in a computing system according to embodiments of the present invention. The example method of FIG. 3 is similar to the example method of FIG. 2 as it also includes receiving (206) an image (202) for one or more computing devices in the computing system (200), identifying (208) available protected computer memory (222a, 222b) within the computing system (200), slicing (210) the image (202) into a plurality of image slices (212, 214), and storing (216) one or more of the image slices (212, 214) in the available protected computer memory (222a, 222b).

In the example method of FIG. 3, identifying (208) available protected computer memory (222a, 222b) within the computing system (200) includes broadcasting (302), by the backup image manager (204) to each computing device (152, 182) in the computing system (200), a request (306) for available protected computer memory (222a, 222b) within each computing device (152, 182). In the example method of FIG. 3, the request (306) for available protected computer memory (222a, 222b) within each computing device (152, 182) may be broadcast (302) to each computing device (152, 182) in the computing system (200) over any data communications link between the computing devices (152, 182) and the backup image manager (204). The request (306) for available protected computer memory (222a, 222b) within each computing device (152, 182) may be embodied, as a data communications message in compliance with a particular data communications protocol for transmitting messages across the data communications link between the computing devices (152, 182) and the backup image manager (204).

In the example method of FIG. 3, identifying (208) available protected computer memory (222a, 222b) within the computing system (200) may also include receiving (304), by the backup image manager (204) from each computing device (152, 182) in the computing system (200), a message (308, 310) identifying available protected computer memory (222a, 222b) within each computing device (152, 182). In the example method of FIG. 3, each message (308, 310) identifying available protected computer memory (222a, 222b) within each computing device (152, 182) may include, for example, the amount of available protected computer memory (222a, 222b) available from the computing device (152, 182) that generated the message (308, 310).

Figure 4:
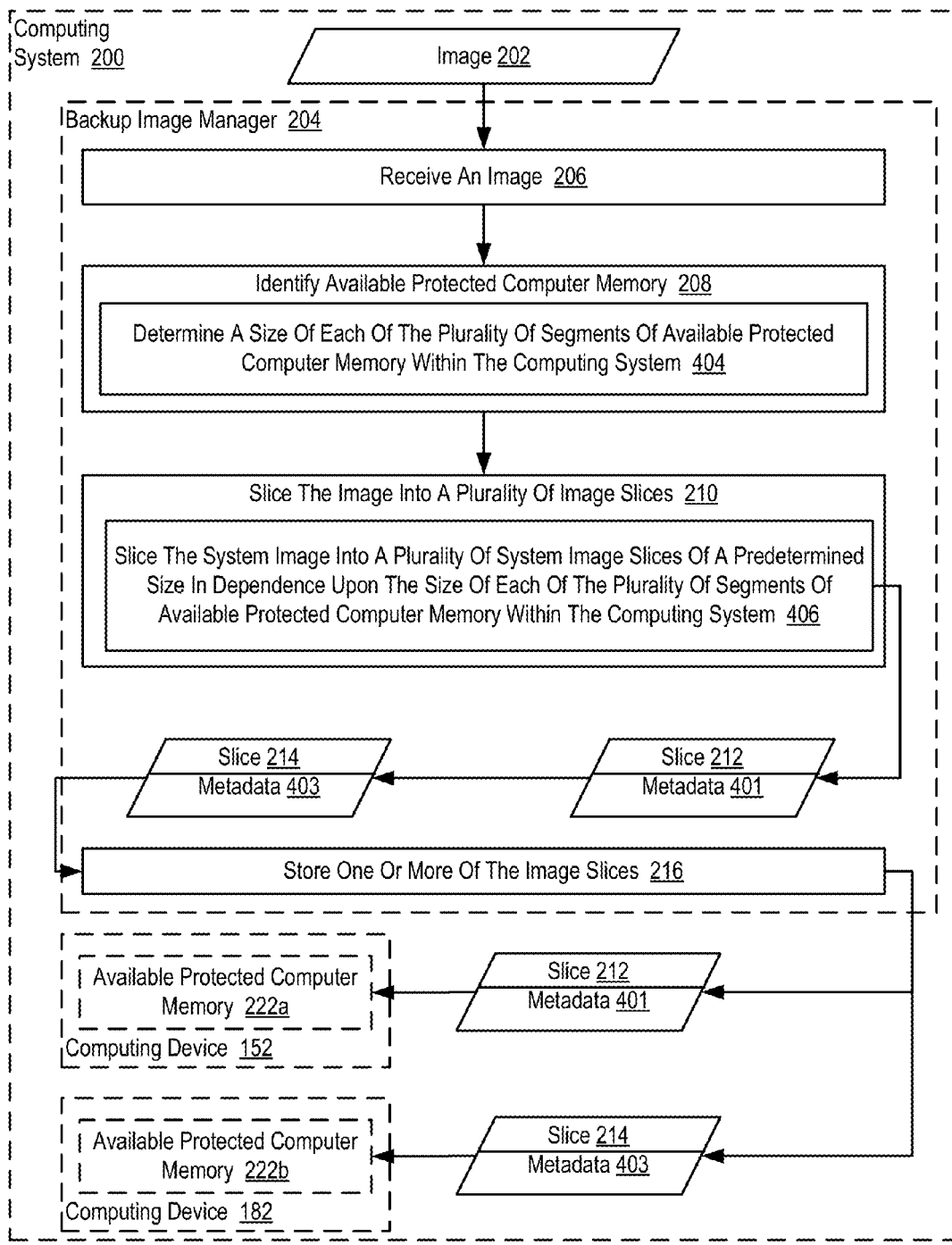
FIG. 4 sets forth a flow chart illustrating a further example method for backing up an image in a computing system according to embodiments of the present invention.

For further explanation, FIG. 4 sets forth a flow chart illustrating a further example method for backing up an image in a computing system according to embodiments of the present invention. The example method of FIG. 4 is similar to the example method of FIG. 2 as it also includes receiving (206) an image (202) for one or more computing devices (152, 182) in the computing system (200), identifying (208) available protected computer memory (222a, 222b) within the computing system (200), slicing (210) the image (202) into a plurality of image slices (212, 214), and storing (216) one or more of the image slices (212, 214) in the available protected computer memory (222a, 222b).

In the example method of FIG. 4, identifying (208) available protected computer memory (222a, 222b) within the computing system (200) can include determining (404), by the backup image manager (204), a size of each of a plurality of segments of available protected computer memory (222a, 222b) within the computing system (200). In the example method of FIG. 4, a segment of available protected computer memory (222a, 222b) within the computing system (200) represents a contiguous block of protected computing memory that is currently not in use. In the example method of FIG. 4, the size of each of the plurality of segments of available protected computer memory (222a, 222b) within the computing system (200) may be expressed as bytes, kilobytes, blocks of a predetermined size, and so on. Determining (304) a size of each of the plurality of segments of available protected computer memory (222a, 222b) within the computing system (200) may be carried out, for example, by examining information sent by each computing device (152, 182) identifying available protected computer memory (222a, 222b) within the particular computing device (152, 182).

In the example method of FIG. 4, slicing (210) the image (202) into a plurality of image slices (212, 214) includes slicing (406), by the backup image manager (204), the image (202) into a plurality of image slices (212, 214) in dependence upon the size of each of the plurality of segments of available protected computer memory (222a, 222b) within the computing system (200). Slicing (406) the image (202) into a plurality of image slices (212, 214) in dependence upon the size of each of the plurality of segments of available protected computer memory (222a, 222b) within the computing system (200) may be carried out by creating an image slice (212, 214) whose size is identical to the size of a particular segment in available protected computer memory (222a, 222b) where the image slice (212, 214) will be stored. Each segment of available protected computer memory (222a, 222b) within the computing system (200) may be uniform in size or may be of varying sizes. As such, each image slice (212, 214) may also be uniform in size or each image slice (212, 214) may be of varying sizes.

In the example method of FIG. 4, the available protected computer memory within the computing system (200) includes segments of available protected computer memory (202a, 202b) on a plurality of computing devices (152, 182) within the computing system (200). The plurality of computing devices (152, 182) within the computing system (200) may include, for example, two of more modules of flash memory in a single enclosure such as a blade server, a first module of flash memory on a first blade server and a second module of flash memory on a second blade server, and so on. That is, the plurality of computing devices (152, 182) may be embodied as multiple memory devices within the same enclosure, memory devices within two or more enclosures, memory devices of differing types, and so on.

In the example method of FIG. 4, each of the image slices (212, 214) includes metadata (401, 403) describing the image slice (212, 214). The metadata (401, 403) describing the image slice (212, 214) can include, for example, information such as a sequence number that enables the image (202) to be reconstructed properly, error detection information used to determine whether the image slice (212, 214) has been corrupted, error correction information used to repair a corrupted image slice (212, 214), and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims

What is claimed is:

1. A method of backing up an image in a computing system, the computing system including computer memory, the method comprising:
   receiving, by a backup image manager, an image for one or more computing devices within the computing system;
   identifying, by the backup image manager, available protected computer memory within the computing system, wherein the available protected computer memory within the computing system is restricted from alteration by a user of the computing system;
   slicing, by the backup image manager, the image into a plurality of image slices; and
   storing, by the backup image manger, one or more of the image slices in the available protected computer memory.

2. The method of claim 1 wherein identifying available protected computer memory within the computing system further comprises broadcasting, by the backup image manager to each computing device in the computing system, a request for available protected computer memory within each computing device.

3. The method of claim 2 wherein identifying available protected computer memory within the computing system further comprises receiving, by the backup image manager from each computing device in the computing system, a message identifying available protected computer memory within each computing device.

4. The method of claim 1 wherein identifying available protected computer memory within the computing system includes determining, by the backup image manager, a size of each of a plurality of segments of available protected computer memory within the computing system.

5. The method of claim 4 wherein slicing the image into a plurality of system image slices further comprises slicing, by the backup image manager, the image into a plurality of image slices in dependence upon the size of each of the plurality of segments of available protected computer memory within the computing system.

6. The method of claim 1 wherein the available protected computer memory within the computing system includes one or more segments of available protected computer memory on a plurality of computing devices within the computing system.

7. The method of claim 1 wherein each of the image slices includes metadata describing the image slice.

8. An apparatus for backing up an image in a computing system, the apparatus comprising a computer processor, a computer memory operatively coupled to the computer processor, the computer memory having disposed within it computer program instructions that, when executed by the computer processor, cause the apparatus to carry out the steps of:
   receiving, by a backup image manager, an image for one or more computing devices within the computing system;
   identifying, by the backup image manager, available protected computer memory within the computing system, wherein the available protected computer memory within the computing system is restricted from alteration by a user of the computing system;
   slicing, by the backup image manager, the image into a plurality of image slices; and
   storing, by the backup image manger, one or more of the image slices in the available protected computer memory.

9. The apparatus of claim 8 wherein identifying available protected computer memory within the computing system further comprises broadcasting, by the backup image manager to each computing device in the computing system, a request for available protected computer memory within each computing device.

10. The apparatus of claim 9 wherein identifying available protected computer memory within the computing system further comprises receiving, by the backup image manager from each computing device in the computing system, a message identifying available protected computer memory within each computing device.

11. The apparatus of claim 8 wherein identifying available protected computer memory within the computing system includes determining, by the backup image manager, a size of each of a plurality of segments of available protected computer memory within the computing system.

12. The apparatus of claim 11 wherein slicing the image into a plurality of image slices further comprises slicing, by the backup image manager, the image into a plurality of image slices in dependence upon the size of each of the plurality of segments of available protected computer memory within the computing system.

13. The apparatus of claim 8 wherein the available protected computer memory within the computing system includes one or more segments of available protected computer memory on a plurality of computing devices within the computing system.

14. The apparatus of claim 8 wherein each of the image slices includes metadata describing the image slice.

15. A computer program product for backing up an image in a computing system, the computing system including computer memory, the computer program product disposed upon a non-transitory computer readable medium, the computer program product comprising computer program instructions that, when executed, cause a computer to carry out the steps of:
- receiving, by a backup image manager, an image for one or more computing devices within the computing system;
- identifying, by the backup image manager, available protected computer memory within the computing system, wherein the available protected computer memory within the computing system is restricted from alteration by a user of the computing system;
- slicing, by the backup image manager, the image into a plurality of image slices; and
- storing, by the backup image manger, one or more of the image slices in the available protected computer memory.

16. The computer program product of claim 15 wherein identifying available protected computer memory within the computing system further comprises broadcasting, by the backup image manager to each computing device in the computing system, a request for available protected computer memory within each computing device.

17. The computer program product of claim 16 wherein identifying available protected computer memory within the computing system further comprises receiving, by the backup image manager from each computing device in the computing system, a message identifying available protected computer memory within each computing device.

18. The computer program product of claim 15 wherein identifying available protected computer memory within the computing system includes determining, by the backup image manager, a size of each of a plurality of segments of available protected computer memory within the computing system.

19. The computer program product of claim 18 wherein slicing the image into a plurality of image slices further comprises slicing, by the backup image manager, the image into a plurality of image slices in dependence upon the size of each of the plurality of segments of available protected computer memory within the computing system.

20. The computer program product of claim 15 wherein the available protected computer memory within the computing system includes one or more segments of available protected computer memory on a plurality of computing devices within the computing system.

* * * * *